United States Patent [19]

Ziegler, deceased et al.

[11] 4,063,009

[45] Dec. 13, 1977

[54] POLYMERIZATION OF ETHYLENICALLY UNSATURATED HYDROCARBONS

[75] Inventors: Karl Ziegler, deceased, late of Mulheim (Ruhr), Germany, by Heinz Martin; Heinz Breil, Mulheim (Ruhr), Germany; Erhard Holzkamp, Mulheim (Ruhr), Germany; Heinz Martin, Mulheim (Ruhr), Germany

[73] Assignee: Studiengesellschaft Kohle m.b.H., Mulheim (Ruhr), Germany

[21] Appl. No.: 745,999

[22] Filed: July 1, 1958

[30] Foreign Application Priority Data

| | | |
|---|---|---|
| Jan. 19, 1954 | Germany | Z 3942 |
| Aug. 16, 1954 | Germany | Z 4375 |
| Dec. 27, 1954 | Germany | Z 4629 |
| Aug. 3, 1954 | Germany | Z 4348 |

[51] Int. Cl.$^2$ .......................... C08F 4/66; C08F 4/68; C08F 10/00

[52] U.S. Cl. ..................... 526/159; 526/95; 526/105; 526/107; 526/151; 526/164; 526/169; 526/351; 526/352; 526/906

[58] Field of Search ............. 260/94.9, 93.7; 526/159, 169, 164

[56] References Cited

U.S. PATENT DOCUMENTS

| | | | |
|---|---|---|---|
| 2,964,574 | 12/1960 | Wilke | 260/666 |
| 2,977,349 | 3/1961 | Brockway et al. | 260/94.3 |
| 2,979,544 | 4/1961 | Wilke | 260/666 |
| 2,990,434 | 6/1961 | Smith | 260/673.5 |
| 3,058,963 | 10/1962 | Vandenberg | 260/88.2 |
| 3,075,958 | 1/1963 | Kastning et al. | 260/94.9 E |
| 3,175,999 | 3/1965 | Natta et al. | 260/93.7 |
| 3,197,452 | 7/1965 | Natta et al. | 260/93.7 |
| 3,258,455 | 6/1966 | Natta et al. | 260/93.7 |
| 3,293,230 | 12/1966 | Coover et al. | 260/93.7 |
| 3,438,956 | 4/1969 | Natta et al. | 260/93.7 |
| 3,582,987 | 6/1971 | Natta et al. | 260/93.7 |

FOREIGN PATENT DOCUMENTS

| | | |
|---|---|---|
| 785,314 | 10/1957 | United Kingdom. |
| 887,305 | 1/1962 | United Kingdom. |

*Primary Examiner*—Edward J. Smith
*Attorney, Agent, or Firm*—Burgess, Dinklage & Sprung

[57] ABSTRACT

Alpha olefins are polymerized alone or in admixture at comparatively low pressures to produce polymers employing a two-component catalyst wherein one component is an organozinc or organomagnesium compound, e.g. zinc diethyl, magnesium diphenyl, propyl magnesium chloride, etc. The other component is a salt, oxide or hydroxide of a metal of Group IV-B, V-B or VI-B of the Periodic System, including thorium and uranium.

29 Claims, 1 Drawing Figure

POLYMERIZATION OF ETHYLENICALLY UNSATURATED HYDROCARBONS

Figure 1:
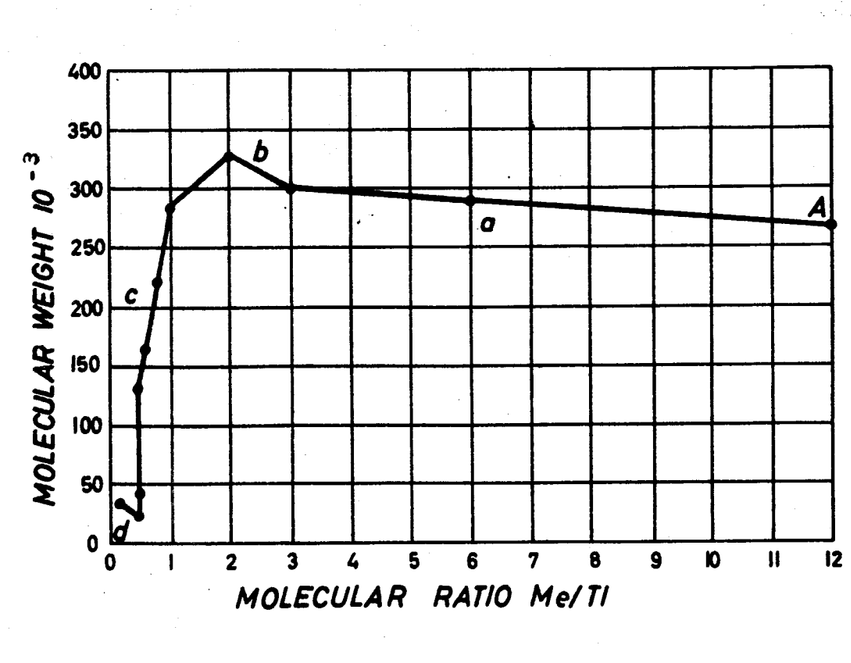

This invention relates to new and useful improvements in the polymerization of ethylenically unsaturated hydrocarbons for the production of high molecular polymers. This application only contains material disclosed in our copending applications Ser. No. 482,413 filed Jan. 17th, 1955, now abandoned, Ser. No. 527,413 filed Aug. 9, 1955, now abandoned, Ser. No. 554,631 filed Dec. 22, 1955, now abandoned, and Ser. No. 514,068 filed June 8, 1955.

The polymerization of ethylene for the production of polymers ranging from gaseous through solid polymers is well known. When producing solid polymers from gaseous ethylene, high pressures of, for example 1000 atmospheres and more were generally required and oxygen or peroxides were generally used as the polymerization catalyst. The yield obtained by these conventional methods was generally low with, for example, about 15 – 20% of the ethylene being converted in a single operation into the polyethylene.

The highest polyethylene polymer which could be effectively obtained by the prior known methods had a molecular weight of about 50,000.

It has also been proposed to polymerize ethylenes using aluminum trialkyls as the polymerization catalyst. This polymerization reaction, however, is generally intended for producing low molecular polymers not ranging substantially above the liquid range. It has further been proposed to modify the polymerization using the aluminum trialkyl catalysts by the addition of auxiliary catalysts such as nickel or cobalt. In this connection, there are obtained low molecular polymerization products, such as a butene-1.

Higher molecular polyethylenes may also be obtained from ethylene using an aluminum trialkyl catalyst by selecting a suitable quantity ratio of the aluminum trialkyl to the ethylene. It is, however, very difficult to obtain polyethylene of a molecular weight higher than a few thousand as it is necessary to use a very small quantity of the aluminum trialkyl as, for example, aluminum triethyl for the production of higher molecular products. With the use of such small quantities of the aluminum trialkyl, however, the reaction becomes very sensitive to traces of impurity in the ethylene and proceeds very slowly, since the quantity of catalyst in the total reaction mixture is very small.

It has been further proposed to use in addition to an oxygen catalyst, metals and organic halides, which give re-agents of the Grignard type, as, for example, magnesium and zinc, and alkyl halides.

In accordance with still another proposal, the ethylene is maintained in the liquid phase at a temperature below its critical temperature of about 9.6° C. in the presence of a mixture of zinc and magnesium alkyls with free metals of the eighth group and first sub-group of the Periodic System. When salts of these metals are used, the conditions are so selected that free metals are produced.

In an alternative proposal, ethylene is to be polymerized in the liquid phase with a catalyst, comprising peroxides and ions of silver, titanium, vanadium, chromium, manganese, iron, cobalt, nickel, and copper, it being critical for effecting polymerization, that the metal used is maintained in ionized form.

One object of the invention is a new process for polymerizing ethylenically unsaturated hydrocarbons.

Another object of this invention is a new process for polymerizing ethylene into high molecular polyethylenes which may be used as plastics.

A further object of this invention is a new process for the polymerization of ethylene into high molecular polyethylenes with a higher yield than heretofore obtainable.

A still further object of the invention is the polymerization of ethylene into polyethylenes having molecular weights higher than those heretofore obtainable.

These and still further objects will become apparent from the following description.

In accordance with the invention at least one ethylenically unsaturated hydrocarbon of the general formula $CH_2=CHR$ is polymerized into high molecular products by contact with a catalyst composed of a mixture of a first and second component, said first component being at least in part composed of a member of the group consisting of the organo metal, alkyl-, aryl-, aralkyl-, alkyl aryl- and mixed alkyl and aryl compounds of magnesium and zinc and their monohalogeno derivatives, any balance of said first component being aluminum trihydrocarbon, said second component being a heavy metal compound selected from the group consisting of the non-ionized salts, including organic salts, and the freshly precipitated oxides and hydroxides of metals of groups IV-B, V-B and VI-B of the Periodic System including thorium and uranium. R in said formula may be hydrogen or a hydrocarbon radical. A satisfactory catalyst is obtained without the presence of aluminum trihydrocarbon, although the presence of the latter will give in most cases improved results. Aluminum trihydrocarbons for use in catalysts are described in detail in our copending application Ser. No. 692,020 filed Nov. 26, 1957, now U.S. Pat. No. 3,574,138.

The designation aryl or similar expression as used herein generically, in identification of an organo zinc or magnesium compound, is intended to include, as is well understood in the art, an organo Mg- or Zn- compound having one or more aryl, aralkyl or alkylaryl substituents.

The term "non-ionized salt" as used herein is intended to designate the true salt as such and which under the conditions of the formation of the catalyst mixture and the contacting with the ethylenically unsaturated hydrocarbon is not reduced to free metal and is not ionized.

Except as otherwise limited herein, the term "salt" or "salts" designating a compound having a heavy metal of the IV-B, V-B and VI-B groups of the Periodic System, including thorium and uranium, is employed in its broadest sense i.e. to connote the reaction product between a base and an acid, including products of the type of acetylacetonates and further including salts in which said periodic system group member is present as a cation as well as those in which such member is present as an anion such as in products of the type of titanates, zirconates, chromates, molybdates or tungstates. The term "pure alcoholates" hereafter used in designation of the said "salts" is intended to connote "salts" having solely alcoholate radicals attached to said heavy metal. "Mixed alcoholates" of said heavy metals as hereafter referred to are such salts having at least one alcoholate radical and at least one nonalcoholate radical.

Particularly good results are produced with heavy metal compounds which are soluble in inert organic solvents such as hydrocarbons.

The term "high molecular" as used herein is intended to designate molecular weights of more than 2,000, and preferably more than 10,000.

The herein designated numerical values for molecular weights are based, in accordance with conventional practice, on the viscosity of the solutions of the polyethylene for which the molecular weight determination is to be made. This viscosity is expressed as "intrinsic viscosity" ($\eta$) which is to be calculated on the basis of an equation given by Schulz and Blaschke (Journal fur Praktische Chemie, Volume 158 (1941) pp. 130–135, equation 5 b p. 132) and corrected for the therein mentioned specific viscosity according to Fox, Fox and Flory (J.Am.Soc.73 (1951) p.1901). The average molecular weight, as for instance that of 50,000 above given, is calculated from such intrinsic viscosity by way of the modified equation of R. Houwink (Journal fur Praktische Chemie, new Edition 157 (1940) pp.15–16 equation 5):

$$MW = Kx (\eta)^a$$

for which the constant $K = 2.51 \times 10^4$
and the constant $a = 1.235$

On the basis of molecular weights calculated in this manner, polyethylenes having molecular weights of 300,000 up to 3,000,000 and more may be obtained in accordance with the invention.

In general the Zn- or Mg-hydrocarbon is preferably one in which the substituents possess from 0 to one and more aromatic hydrocarbon rings of from $C_6$ to $C_{10}$, i.e., the benzene and naphthalene rings. The Zn- or Mg-alkyl compounds which may be used in forming the catalysts in accordance with the invention may be any conventional or known Zn- or Mg- alkyl as, for example, zinc- or magnesium-, mono or di-methyl, -ethyl, -propyl, -isobutyl, or higher -alkyls (in excess of $C_5$). Convenient higher Zn- or Mg-alkyls are for instance those within the range of average composition of about $C_8$ to $C_{12}$ such as an average composition of Zn- or Mg-dioctyl or -didodecyl or their mixtures. The higher -alkyls are without limitation to the number of carbon atoms. Examples of -aryls which may be employed are: Zn- or Mg- mono- or di-phenyl, -tolyl, -xylyl and -naphthyl and include such aralkyls (the Zn or Mg is linked to the aliphatic chain) as Zn or Mg, mono- or di-benzyl or -phenyl ethyl. Mixed -alkyls and aryls useful in accordance with the invention are compounds in which Zn or Mg are linked both to alkyl residues, for example methyl or ethyl, and also to aryl residues or aralkyl residues, for example phenyl or benzyl.

The organo halogeno metal compound useful in accordance with the invention may be any chloro-, bromo-, iodo- or fluoromagnesium or zinc alkyl or aryl, including appropriate magnesium Grignard and thereto corresponding zinc compounds.

The heavy metal catalyst component useful in accordance with the invention may be any compound of a metal on the left hand side of the IVth to VIth Groups of the Periodic System, including thorium and uranium. In certain of the newer Periodic Charts of the Elements, these metals on the left hand side of the IVth to VI Groups of the Periodic System are designated as Groups IV-B, V-B and VI-B respectively. The term "heavy metal" is used herein in contrast with the relatively lighter metals Al, Zn and Mg. When reference is made herein and in the claims to metals of Groups IV-B, V-B and VI-B of the Periodic System, there is intended any member of these groups, including thorium and uranium, as for example, titanium, zirconium, hafnium, thorium, uranium, vanadium, niobium (columbium), tantalum, chromium, molybdenum and tungsten.

Any compound of these metals such as the halogenides, for example chlorides or bromides, oxyhalogenides, for example oxychlorides, complex halogenides, for example, complex fluorides, freshly precipitated oxides or hydroxides or organic compounds, for example pure alcoholates of the type of esters such as titanium-, zirconium- etc. tetrabutyl esters, mixed alcoholates, acetates benzoates or acetyl acetonates and similar compounds may be used. Also mixed compounds, as for example of the type of mono-, di- or tri halogeno (preferably chloro-) alcoholates of said heavy metals may be used. Salts of titanium, zirconium, uranium, thorium and chromium have been found to be preferable.

A particularly active catalyst in accordance with the invention may be obtained, for example, by mixing a titanium or zirconium compound, such as a tetrachloride, oxychloride or acetyl acetonate with the herein specified Zn- or Mg-hydrocarbon compound or its mono halide derivative.

The exact nature of the catalyst produced by the mixing of the metal compound of Group IV-B to VI-B and the organo metal compound is not known. It is believed that the heavy metal compound is converted to a lower valency form. Thus, for example, upon bringing together the tetravalent zirconium compound and a magnesium or zinc dialkyl, there is formed a compound of monovalent, bivalent or trivalent zirconium. The fact that the quadrivalent zirconium salt undergoes a conversion may be clearly noted from the fact that the initially colorless salt dissolves in metal alkyl, becoming darker in color and generating heat. While the special polymerizing action of the catalyst in accordance with the invention may come from the combination with the organo metal compound, probably the low valence group IV-B, V-B or VI-B metal compound has a high polymerization effect by itself, since for example the action of the metal alkyl derived catalyst on ethylene starts at a lower temperature and takes place more rapidly than the normal reaction of such alkyl with ethylene.

Within the broadest concept of the invention the ratio of organo metal compound (including any halide) to heavy metal compound is not critical with respect to the obtaining per se of high molecular polymers such as exemplified by polyethylenes with molecular weights from 10,000 to 3,600,000 and higher. Expressed in mol ratios they may run from fractions, as for example 0.1, or even less, to multiples of 1, such as 12 or higher, of (organo metal compound)/(heavy metal compound). In the event that the heavy metal compound is a true alcoholate, it is preferable to utilize a mol ratio of (organo metal compound)/heavy metal compound) of at least about 10:1 since such alcoholates will also produce dimers and the dimerization is increasingly favored with decreasing mol ratios.

Whenever the primary objective is to assure that particularly high molecular weights are secured for the polymer produced by use of the catalyst in accordance with the invention, or when oxydizing impurities, as for example moisture or oxygen, are present, such as in ethylene, or in any solvent, it is preferred to utilize an excess of organo metal compound. In that case it is of advantage to use at least 2 mols of the organo metal compound for each mol of heavy metal compound regardless of its valence and preferably, in the case of heavy metal compounds other than acetyl acetonates, $2n$ to $3n$ mols of the organo metal compound to every mol of the heavy metal compound. "$n$" being the valence of the heavy metal.

A typical illustration of such mol ratios is for instance a combination composed of one mol of a tetravalent titanium salt such as $TiCl_4$ and 8-12 mols of organo metal compound. The reasons for the desirability of an excess of this compound, in the event of for example the presence of oxydizing impurities, are based on the following considerations:

When the organo metal compound acts for instance on the tetravalent titanium salt, a reduction takes place which, however, does not reduce the titanium to metallic titanium. If the organo metal compound reacts at first only with one of its hydrocarbon radicals such as an alkyl, as for instance an ethyl group as is true in general for the reactivity of these organo metal compounds, not more than three molecules of organo metal compound will presumably be consumed in the reduction of the tetravalent titanium salt. An excess of hydrocarbon radical component beyond that serving for preparing the catalytically effective material is then normally present when using the above referred to multiple mol amounts specified for heavy metal compound combinations other than acetylacetonates. The excess of organo metal compound is of value to counteract the oxidizing action of impurities frequently present when utilizing the catalyst. Thus in ethylene there may be present, for example, moisture or oxygen which oxidize the air sensitive catalysts and thus impair their activity. The excess of the organo metal compound prevents this oxidation or reduces the already oxidized catalyst to eliminate impurities possibly present in the ethylene. The minimum quantities of the catalysts in relation to monomer, for example olefin such as ethylene, may vary within very wide limits and are dependent upon the purity of the material to be polymerized. When using for instance very pure ethylene, 0.1 parts of catalyst to 1,000 parts of ethylene will already be sufficient. It is evident that larger quantities can be used even in the case of pure ethylene. However, it is desirable to avoid using unnecessarily large quantities of catalyst so as not to make the working up process more difficult than is necessary. Taking very impure monomer, such as ethylene, good results can nevertheless be obtained with quantities of catalysts amounting to only a few percent. If solvents are used for the polymerization, the same applies in connection with the purity of the solvents. The quantities of catalysts employed influence the molecular weight of the polymers produced so that the degree of polymerization and thus the molecular weight will be higher the smaller the quantity of catalysts employed. On the other hand the higher the catalyst concentration the lower will be the molecular weight.

The influencing of the molecular weight however by altering the concentration of the catalyst, has its limitations, in that an increase in the catalyst concentration leads to an increased consumption of catalyst and this makes the process more expensive. In addition, the polymers obtained with high catalyst concentrations contain more ash than those made with low catalyst concentrations and must have this ash removed therefrom by complicated lixiviation or washing with solvents. On the other hand, when the catalyst concentration is considerably reduced for the purpose of raising the molecular weight, the reaction velocity of the polymerization is appreciably reduced and consequently also the yield per unit of volume and time. Moreover, the control of molecular weight by variation of catalyst concentration cannot readily be applied to the range of molecular weights below 100,000, which is a particularly important range in practice.

Within the scope of one embodiment of the instant invention it is possible to obtain for the polymers, variations in molecular weight in a manner avoiding or at least appreciably minimizing some or all of the disadvantages entailed by variation in catalyst concentration and to secure benefits not obtainable by the latter method. This embodiment is based on the discovery that for catalyst combinations, usable in accordance with the invention, variations in mol ratios of (organo metal compound)/(heavy metal compound) will produce different molecular weight polymers. Broadly speaking, lower mol ratios will yield lower molecular weight products and higher mol ratios will give higher molecular weight products. It is thus possible for any given catalyst combination to obtain polymers of predetermined molecular weights by selecting specific predetermined mol ratios for that combination.

The mol ratio variation effect is in each case readily ascertainable from the curve or graph obtained when plotting different mol ratios of given catalyst combinations, useful in accordance with the invention, against the respective molecular weights of the polymers obtained by the use of these given combinations. Such curves or graphs are for instance illustrated in the accompanying drawing. They show the easy securability of any desired molecular weight by selecting the appropriate mol ratio.

It has been further found that each (organo metal compound)/(heavy metal compound) mol ratio versus molecular weight curve for any given catalyst combination, useful in accordance with the invention possesses a relatively "steep" (inclining) portion for which the pitch is greater than the pitch of other portions of the same curve. In many cases the "steep" portion of the curve is additionally characterized by the fact that its pitch corresponds to a greater change in molecular weight for each increase of one mol ratio or less than any section of any other and particularly succeeding curve portion inclining in the direction of increasing mol ratios.

As will be seen in accordance with the foregoing and the more specific exemplification by the illustrated graphs hereafter more fully discussed, the "steep" portion of the mol ratio versus molecular weight curve defines for relatively small increments in mol ratio relatively large increments in molecular weight.

The curve portions adjacent the "steep" portion, i.e. those immediately following and those immediately preceeding the above identified "steep" portion of the graph, defining mol ratio versus molecular weight, in accordance with the invention, may also show for relatively small changes in mol ratio relatively large variations in molecular weight. Whereas the "steep" curve portions normally show molecular weight increases with rising mol ratios of catalyst, the "adjacent" curve portions, may comprise a portion or may be composed of sections in which increments in mol ratios produce decreases in molecular weights. Though the "preceeding" curve portion may exhibit a lesser change in molecular weight than is the case for the curve portion succeeding the "steep" portion, the former may offer nevertheless appreciable advantages. Thus, such "preceeding" curve portion within the range of molecular weights, controlled thereby permits the selection of mol ratios requiring a comparatively small amount of the in many instances relatively expensive, and in higher concentration more difficult to handle organo metal compounds. Within the preferred scope of this embodiment of the invention there are included the "steep" portion of the mol ratio versus molecular weight curve as well as its adjacent lower and upper curve portions showing for relatively small changes in mol ratios relatively large changes in molecular weight. This preferred range is designated in accordance with the invention as the "sensitive range". If the primary consideration is to accomplish savings in organo metal compound material it is of advantage to select that portion, and preferably initial portion, of the mol ratio versus molecular weight curve which in the direction of increasing mol ratios ends (as part thereof) with the relatively "steep" (inclining) portion thereof. Because of the obvious advantages, however, offered by the steeply pitched portion of the curve or graph, the preferred range of the mol ratio versus molecular weight curve is normally represented by the "steep" portion thereof as hereinabove defined.

Inasmuch as increasing mol ratios mean relative decrease in heavy metal compounds which may be in some cases more expensive than some of the more readily availabe organo metal compounds, the sensitive range also permits the determination for selection of a desired molecular weight with the least amount of heavy metal compounds. Further the sensitive range permits in all cases the determination of the highest molecular weight at the most economical mol ratio of materials. Above all, however, the sensitive range and especially the "steep" curve portion thereof permits the obtaining of any desired predetermined molecular weight furnishing therefor predeterminately fixed ratio of catalyst components within a relatively narrow range of adjustment to cover a very wide and in many cases, the entire molecular weight range obtainable for a particular catalyst and condition of polymerization.

Polymerization with the catalysts in accordance with the broad and generic scope of invention is effected by merely contacting the material to be polymerized with the above described catalyst. This may be carried out under reaction conditions generally considered and conventionally termed in the art as "mil" reaction condition (as to temperature and pressure). The contacting may be effected at normal or up to about 10 atmospheres pressure or at comparatively low pressures of about 10 - 100 atmospheres; the contacting pressure is not critical and a smooth polymerization may be effected at atmospheric or subatmospheric pressures. On the other hand, the action of the new catalyst remains fundamentally unchanged, even if the pressure is increased to any desired obtainable value. It is advantageous to work at pressures of 1 to 10 atmospheres. It is an outstanding advantage of the invention that one may operate at ordinary atmospheric pressure with excellent results.

The monomer may be added in vapor phase which is of particular advantage when using normally gaseous olefins such as ethylene. Previously known high pressure ethylene polymerization processes have the further disadvantage that ordinarily only a relatively small proportion of approximately 15 to 20% of the ethylene introduced is converted into polyethylene. On the other hand, ethylene treated with a catalyst in accordance with the invention is predominantly converted. Moreover, the ethylene to be employed with the catalyst of the invention need not be so pure as in the known high pressure processes.

The temperature of the contacting is not critical and the same may be effected at room temperature or below. It is advantageous to operate at somewhat elevated temperatures and particularly above about 50° C.

Thus, in olefin polymerization, as contrasted to prior art processes, the monomer contacted with a catalyst in accordance with the invention may be rapidly converted into high molecular polymer even at low pressures of less than 100 atmospheres and temperatures of less than 100° C. Working at temperatures above 250° C. is not advisable because at this temperature the catalysts may decompose to a considerable extent.

In the practical application of the invention it is also possible to contact the novel catalyst material with several ethylenically unsaturated hydrocarbons to thereby obtain copolymerization. Thus a mixture of olefins such as an ethylene containing gas mixture may be directly used for the polymerization, for example, gases which are generated during the cracking of saturated hydrocarbons, such as ethane or propane, or from mineral oil or its fractions, or generated during similarly conducted Fischer-Tropsch synthesis; if desired they may be freed from other olefins than those desired for the polymerization.

The activity of the catalyst and the degree of polymerization of the final substances obtained are dependent upon the metal compounds selected, the manner of its preparation and the ratio of the quantity of the heavy metal compound to the quantity of the organo metal compound, the latter determining largely the degree of polymerization as above set forth.

Thus, it has been found, that, when using sufficient quantities of the Group IV-B to VI-B metal containing components of the catalyst, titanium-containing catalysts are more active than zirconium-containing catalysts. The activity of the catalyst can be further substantially increased by using for the preparation, instead of a relatively low molecular Zn- or Mg-hydrocarbon or halogeno hydrocarbon, one having larger hydrocarbon radicals.

It is in many cases preferred to operate in the presence of solvents. The solvents should not dissociate or promote the dissociation of the heavy metal compound and particularly the heavy metal salts. Accordingly solvents having a high dielectric constant such as water, methyl alcohol or the like should not be used. Such solvents furthermore tend to destroy the organo- Mg or Zn compounds. Suitable non-dissociating or destroying solvents are: aliphatic and hydroaromatic hydrocarbons, such as pentane, hexane, cyclohexane, tetrahydronaphthalene, decahydronaphthalene, higher paraffins, also in mixtures; paraffins liquid at the reaction temperature; aromatic hydrocarbons, such as benzol, xylol; halogenated aromatic hydrocarbons, such as o-dichloro-benzol, chlorinated naphthalene; ethers such as dibutyl-ether, dioxane, tetrahydrofurane. These solvents are used in such quantities that it is still possible to stir the reaction mixture even when it is nearing the end of the reaction. Generally this stirring operation is possible even when the reaction mixture, as in the case of ethylene, contains 10 to 40% polyethylene at the end of the reaction. Maximum limits only exist as regards the economy of the process.

If Grignard compounds containing solvent ethers are used, it is preferred to remove the ether as completely as possible before admixture with the heavy metal component.

Polyethylenes obtained by use of the catalyst in accordance with the invention, as has been set forth above, have an extremely high molecular weight which may range up to 3,000,000 and more. These polyethylenes are believed to be completely novel and different from the solid polyethylene polymers previously obtained. These new polyethylenes have a softening point or melting point, which will be generically referred to herein as the softening point, of more than 130° C. and are insoluble in all solvents at room temperature.

The polyethylenes produced in accordance with the invention, having a molecular weight up to about 100,000 will be most solvents only partially dissolve at a temperature above about 70° C., while those having a molecular weight above 100,000 will only partially dissolve in such solvents at temperatures above about 100° C. The temperature stability or resistance of the new polyethylenes is greater than that of the known conventional polyethylenes. Upon heating the new products to temperatures above 250° C., they retain their white color, while the color of the known products changes to gray between 200° and 250° C. The resistance of the new polyethylenes to oxidation by atmospheric oxygen is also much greater.

The new polyethylenes in accordance with the invention have a high crystal content which is unusual for high molecular hydrocarbons. The degree of crystallization, as shown by X-ray diagrams, generally amounts to 80% and in many cases even higher. At times also lower values may occur. The crystallinity remains unchanged to a temperature of 100° C. or higher and disappears only near the softening point.

The new polyethylenes are almost completely linear in molecular structure and have practically no branch chains. In general, the percentage of the methyl groups is relatively small, being at most about 0.03% and in some cases even less than 0.01%. Infra-red spectrographs of the new products in accordance with the invention do not show the characteristic methyl band of the prior known polyethylenes. The tear strength of the new polyethylenes in accordance with the invention is a minimum of about 100 kilograms per square centimeter, and frequently more than about 200 kilograms per square centimeter. The tensile strength in undrawn condition is more than about 200 kilograms per square centimeter and in elongation-oriented films or sheets, up to about 3,000 kilograms per square centimeter.

The products may be worked directly, for example, between heated plates, into clear, transparent, elastic and flexible plates or sheets. The polyethylenes are also well suited for working in extrusion presses or for injection molding. In molten state they can be spun into threads by the methods usually employed for spinning superpolyamide threads. They may be cold drawn and may be drawn in this manner into ribbons, wires, or filaments of high elasticity and strength such as have never been obtained with prior known polyethylenes. Already in the working, the new polyethylenes show a remarkable tendency toward fiber formation. The threads produced from the new polyethylenes can be used as threads for industrial purposes. The new products can be spun to form filaments in the molten state by the methods which are conventional for the spinning of superpolyamide fibers such as Nylon fibers. The filaments produced from the new polyethylenes can be employed as fibers for industrial purposes.

In copolymers produced according to the invention, either the alpha-olfein or the other monomer or monomers may predominate in the copolymer molecule. Thus, we have produced copolymers of propylene and ethylene containing, by weight in the polymer molecule, 10% of propylene and 90% of ethylene. We have also produced copolymers containing, in the polymer molecule, 30% of isobutylene and 70% of ethylene. Copolymers containing in the polymer molecule, 50% of propylene and 50% of ethylene have been prepared by the method described herein. Copolymers containing up to 70% ethylene and up to 30% propylene are contemplated.

The following examples are given by way of illustration and not limitation, all operations involving the handling or obtaining or normally pyrophorous materials or of those tending to be pyrophorous and especially the catalyst combinations being carried out in an inert atmosphere such as $N_2$, as is conventional practice in the art.

EXAMPLE 1

Two grams titanium tetrachloride are dissolved in 50 cc hexane and 3.5 grams solid magnesium dimethyl are added in a nitrogen atmosphere. The mixture is introduced, under nitrogen, into a small ball mill and vigorously ground for one hour. The ball mill is then emptied into a 20° cc autoclave and the ball mill itself washed out with an additional 25 cc of hexane. Ethylene is thereupon added under a pressure of 70 atmospheres and the autoclave is shaken. The autoclave spontaneously heats itself to about 50° C. and the ethylene pressure drops. Ethylene is again added three times under pressure until a total of 30 grams of ethylene have been introduced into the autoclave. Finally, the autoclave is shaken for a few hours until the pressure in it has dropped to a low residual amount. The contents of the autoclave then consists of a solid cake or baked-together polyethylene particles permeated by the solvent. The cake can be very easily removed from the autoclave. It is kneaded with methyl alcohol and thereupon washed with methyl-alcoholic hydrochloric acid and then again with methyl alcohol, and then dried. There is obtained a white polymer which is insoluble, or at most swells in the customary solvents, and which becomes soft at between 150° and 200° C. It can be readily molded at 170° C. into a clear foil.

In the experiment described here, it is immaterial whether ethylene is used under the indicated pressure or at lower pressures, or even with the passage of ethylene through the catalyst mixture.

EXAMPLE 2

A solution of 35 grams chrome acetylacetonate in a quantity of xylene just sufficient to dissolve it is poured while hot into a Grignard solution consisting of 24 grams magnesium, 94 grams butyl chloride, and 500 cc ether. Reaction takes place with a violent boiling of the ether, the mixture assuming a dark color. This mixture is an excellent catalyst for the polymerization of ethylene.

EXAMPLE 3

To 24.6 grams zinc diethyl, there are added 6 grams finely pulverized anhydrous zirconium tetrachloride, followed by heating until the particles of zirconium tetrachloride, which at first were still suspended, have completely disappeared. There is thereupon added under nitrogen 200 cc benzene. The mixture is then poured into a 50° cc autoclave and treated with ethylene in the manner described in Example 1. The ethylene is rapidly absorbed and a swollen gel-like mass of polyethylene deposits in the autoclave, which mass is first of all thoroughly kneaded with methyl alcohol and thereupon freed from the solvents by steam distillation in the presence of ordinary hydrochloric acid. The polyethylene the remains suspended in the aqueous phase in the form of pure white granules. The yield of polyethylene is practically quantitative.

EXAMPLE 4

Into a Grignard solution consisting of 157 grams bromobenzene and 24 grams magnesium in 500 cc ether, there are added drop by drop, at the boiling point, 42.5 grams of the tetrabutyl ester of orthotitanic acid — $Ti(OC_4H_9)_4$— followed by heating for a further hour at a gentle boil. Advisedly as much ether as possible is then distilled from a bath heated to 50° C., and the mixture which still remains is introduced into an autoclave of suitable size. Ethylene is introduced under a pressure of about 50 atmospheres, and the autoclave is heated to about 100° C. In this way the ethylene is rapidly polymerized and thereupon further polyethylene can be added under pressure a number of times before the activity of the catalyst is finally weakened, due to its being enveloped by the deposited polymers. The further treatment is effected in a manner similar to that described in the preceding examples. The polyethylene obtained is similar to the products which can also be obtained with titanium tetrachloride and Grignard compound.

EXAMPLE 5

A solution of magnesium chloropropyl is first of all prepared from 24 grams magnesium and 78 grams n-propyl-chloride in 500 cc ether in the customary manner, and this solution is caused to flow into 1 liter of boiling toluene while stirring. The toluene is contained in a distillation apparatus provided with a column and a powerful stirrer. The ether is distilled over into the column with stirring, and finally a quantity of toluene is also permitted to distill over so that the index of refraction of the distillate again reaches exactly the value of the index of refraction of toluene. During this operation, the magnesium chloropropyl deposits as a fine insoluble precipitate in the toluene. The volume of the suspension at the end of the operation should again be about 500 cc. If necessary, additional toluene must be added during the distillation. The suspension finally obtained is advisedly again ground for a few hours in a ball mill. To 25 cc of this suspension of magnesium chloropropyl in toluene, there are then carefully added 1.9 grams titanium tetrachloride, followed preferably by a further grinding in a small ball mill. The suspension obtained, which now has a dark color, is treated with 1 liter completely saturated dry and air-free Fischer-Tropsch diesel oil, whereupon ethylene is introduced with the exclusion of air, while stirring, and heating to a temperature of about 60° to 70° C. The ethylene is immediately absorbed and the separation of flocculent polyethylene commences very soon. The rate of absorption can be accelerated by increasing the ethylene pressure to about 10 atmospheres. The introduction is continued until the stirrer stops. By this time, about 200 to 500 grams of polyethylene have deposited.

EXAMPLE 6

10 Grams of zinc diphenyl (produced by the process described in Berichte der deutschen Chemischen Gesellschaft 46, 1675 (1913) were ground in an atmosphere of nitrogen with 4.5 g. of titanium tetrachloride and 50cc of hexane for three hours in an oscillating ball mill. The black suspension formed was introduced into a 200 cc autoclave and 42 g. of ethylene were pumped in. The autoclave was then shaken vigorously for 35 hours at a temperature of 100° C. During this time the pressure fell to 27 atmospheres gauge. 12 g. of ethylene were blown off after cooling. The autoclave containing 25 g. of polyethylene suspended in hexane.

EXAMPLE 7

In a manner analogous to that described in Example 6, 8 g. of magnesium diphenyl (produced by the process described in Berichte der deutschen Chemischen Gesellschaft 46, 1675 (1913) were ground in an atmosphere of nitrogen with 4.5 g. of titanium tetrachloride and 50 cc of hexane for three hours in an oscillating ball mill. The further procedure was as described in Example 6 and 28 g. of polyethylene were obtained after shaking for 30 hours at 100° C.

EXAMPLE 8

23 g of a coarsely ground magnesium aluminum alloy of the composition $Mg_3Al_2$ are ground for 36 hours in 100 cc of hexane with 8.8 g. of titanium tetrachloride, under nitrogen in a small ball mill. After the 36 hour grinding period, titanium tetrachloride can no longer be detected in samples of the clarified solution. The resulting grayblack catalyst suspension is introduced under nitrogen into a 5 liter autoclave equipped with a stirrer. 790 g. propylene are then pumped in at room temperature. Stirring is commenced and the autoclave is heated to 80° C. After stirring for about 50 hours the pressure has considerably fallen, whereupon the autoclave is allowed to cool and excess propylene is vented. 130 g. of unreacted monomeric propylene are recovered. The reaction mass contained in the autoclave is washed with acetone which is removed by filtration under suction. Residual catalyst is extracted by heating with alcoholic hydrogen chloride. After repeated washing with acetone and drying, 660 g. of a white polypropylene are obtained. At about 140° C. the same may be readily pressed into flexible films or foils or rolled into sheets. The sheets or films appear transparent when relatively thin and opaque when relatively thick.

EXAMPLE 9

To 67.5 g of water-free zinc chloride (0.5 mol) were added under nitrogen 282 g(1 mol) of a hydride-free aluminum-tri-n-hexyl. Within one hour the zinc chloride dissolved with slight heating of the mixture. There was then added to the reaction mixture 65g (1.1 mol) of potassium fluoride, whereupon the mixture was stirred for two hours at 120° C. The resulting zinc dihexyl was then freed by distillation ($10^{-4}$ Torr) from the potassium fluoride aluminum alkyl complex.

23.5 Grams (0,1 mol) of the thusly produced and purified zinc dihexyl were admixed under nitrogen with 50 cc of hexane and 4.5 g of titanium tetrachloride. After stirring the mixture for one hour at 70° C. the same was transferred into a 200 cc autoclave. 54 Grams of ethylene were pressed into the autoclave and the same was vigorously shaken for 30 hours at 100° C.

Upon cooling 15 g of ethylene were vented. There remained in the autoclave 34 g of polyethylene suspended in hexane.

EXAMPLE 10

67.5 Grams of water-free zinc chloride were mixed under nitrogen with 384 g of aluminum-tri-(2-phenyl-propyl-(1)). The zinc chloride had dissolved after 5 hours heating at 120° C. The separation of the reaction mixture was effected by high vacuum distillation. The zinc-di-(2-phenyl-propyl-(1)) distilled off at $10^{-2}$ Torr. In order to purify the same 20 g of potassium fluoride were added and the mixture was distilled at 115° – 116° C. At $10^{-4}$ Torr the yield was 136 g (90%). 30.3 Grams of the thusly obtained and purified zinc-di-(2-phenyl-propyl-(1)) were dissolved in 70 cc of hexane. 4.5 Grams of titanium tetrachloride were added to the resulting solution and the darkening catalyst mixture was then stirred for one hour at 70° C. The same was then transferred into a 200 cc autoclave into which were pressed 48 g of ethylene, whereupon the autoclave was shaken for 30 hours at 90°-100° C. During this time, the pressure fell to 31 atmospheres in excess of atmospheric. After venting of excess ethylene the autoclave containing 22 g of polyethylene suspended in hexane.

A schematic exemplification of the sensitive range of different mol ratios for a specific catalyst combination is for instance furnished by the curve of the appended FIGURE. The same would be based on the results of a number of ethylene polymerization experiments with the organo metal compound, as for instance Zn diethyl and the heavy metal such as titanium tetrachloride using different mol ratios. The various above examples can each be used for the obtaining of a graph representing the specific metal organo compound - heavy metal system.

The amount of organo metal compound necessary for each experiment is preferably initially dissolved or finely dispersed in 250 cc of diesel oil distilled with sodium and having a boiling point of 180° – 240° C., the said oil being produced by carbon monoxide hydrogenation according to Fischer-Tropsch. In all cases the same amount of heavy metal compound, such as for titanium tetrachloride, 4.75 g thereof is added dropwise at room temperature while stirring. In addition, 2.25 liters of the said diesel oil are saturated with ethylene in a closed stirrer-type apparatus filled with nitrogen and then the catalyst solution is run in. If the heavy metal compound does not readily lend itself to dropwise addition, or where it is otherwise desirable, the same may be added in organic solvent and preferably hydrocarbon such as said diesel oil solution. In that event the amount of solvent in such solution is to be calculated as part of the specified total solvent, i.e. specifically as part of the total 2500 cc diesel oil used.

By starting, for example, with 12 mols of organo metal compound per mol of titanium tetrachloride and then reducing in stages the amount of organo metal compound used while keeping the amount of titanium tetrachloride constant, the influence of this step on the molecular weight of the polymers obtained may be initially slight (Section "a" of curve). In that case a relatively slight increase in the average molecular weight of the polyethylene occurs up to a ratio of about 3 : 1. Thence to a ratio of 2 : 1, the molecular weight again increases somewhat more strongly to the region of 320,000 under the conditions set out above (Section "b" of curve). A "steep" range then follows (Section "c" of curve) in which extraordinarily small changes in the ratios exert quite an appreciable influence on the molecular weight of the polymers obtained. If a ratio of 2 Me : 1 Ti is initially used and if the ratio is changed to 1:1 to 0.5:1, this causes a drop in the molecular weight from 320,000 and 20,000, so that it is possible to obtain any desired molecular weight between about 20,000 and 320,000 by a fine adjustment of the ratio between the organic aluminum compound and the titanium tetrachloride within this range "c" of the curve. In each case, the results obtained only apply for the specific experimental conditions used, since there are, as already mentioned, other factors which influence the molecular weight of the polymer. Depending on these other conditions, the polymerization curves, as for instance of the system represented by the examples herein, may plot differently and the starting point of the "steep" ranges may be shifted to different levels. For any given set of polymerization conditions and catalyst combination, however, if the molecular ratio of aluminum trihydrocarbon to heavy metal compound is reduced, a range such as the sensitive range $b + c + d$ of the curve exists in which further changes in molecular ratio permit an extraordinary sensitive regulation within a relatively wide range of any desired predetermined molecular weight of the polymer. This is particularly true of range "c". In certain cases the entire "sensitive" range may be essentially composed of the "steep" portion of the curve such as section "c" of the curve.

The curve exemplies also limits of the sensitive range in which the molecular weight of the polymer changes considerably with a relatively small change in molecular ratio as for instance between 0.2 : 1 and 3 : 1 and preferably 2 : 1. Any section of the curve defined by the curve portion between 0.2 and 2.0 mol ratios, including that between 0.2 and 0.5, corresponds to a greater molecular weight change per 0.3 mol ratios than any section following 2.0. The limits are different for various combinations.

The essential feature of this "sensitive" range embodiment of the present invention does not consist so much in determining the accurate numerical limits of these sensitive ranges or the preferred "steep" portion thereof for each conceivable combination, as in the fundamental discovery that there is in fact such a sensitive range or "steep" portion. The position or scope of this range can be determined easily for any given combination by a small series of experiments and plotting the results of the experiments by means of curves. The values to be used for plotting molecular weight curve should be selected from a larger number of intermediate values to define the section terminal of the corresponding curves.

A typical example of a "steep" range section of a molecular weight variation curve is for instance that of the system zinc-diethyl titaniumtetrachloride. For a molecular ratio of $Zn(C_2H_5)_2/TiCl_4$ of 6 : 1 a greyish-black catalyst is obtained with a reaction time of 4 hours which upon contact with ethylene under the conditions of Example 3 gives a yield of about 15 g polyethylene. The average molecular weight of a polyethylene obtained with this 6 : 1 ratio is 18.000. On the other hand, when varying the mol ratios of the $Zn(C_2H_5)_2/TiCl_4$ to represent lesser amounts of the organo metal compound sharply increasing molecular weights are obtained, so that at a ratio of 3 : 1 for which the color of the catalyst is grey and the yield of polyethylene after 4 hours reaction time is 6 g. An average molecular weight of 76.000 is obtained.

The products obtained in accordance with the invention are characterized by their inherent low melt index. The melt inex as is well understood in the art, expresses the characterization of a moldable product to be relatively stable with respect to its viscosity within a relatively wide temperature range. In other words the viscosity - temperature curve is relatively flat or less steep so that a desired degree of viscosity can be retained over a greater temperature range without the danger of a too great fluidity causing a "running away" condition.

Polyolefins and especially polyethylene prepared in accordance with the invention possess for molecular weights of a magnitude of about 50 to 60,000, a melt index not in excess of substantially about 1. With increasing molecular weights the melt index of the products in accordance with the invention are even lower, being, for instance, of a value of approximately less than 0.1 for molecular weights of a magnitude of approximately 100,000 to 120,000.

The effective or most effective utilization of various catalyst combinations applicable in accordance with the invention makes it is most cases desirable to use a relatively pure initial monomer. As above pointed out, if for instance ethylene contains certain impurities, these may inactivate portions of the heavy metal compound, and/or the organo metal compound present in the solution and may thus undesirably shift the mol ratio initially present between the catalyst components. These difficulties, however, may be avoided if the ethylene or the gas mixture containing ethylene is preliminarily contacted or washed with organo metal compounds, preferably organic compounds of aluminum, before entering the reaction vessel in which it is to be contacted with the herein described catalyst material. When proceeding in this manner, the polymerization of the ethylene is actually carried out in two separate steps.

The organo metal compound useable in the first step of the just described two-step procedure is preferably one corresponding to the general formula RAlXY or RMeY in which R is hydrogen or a hydrocarbon radical, X is R or OR', Y is R or OR', R' is a hydrocarbon radical and Me is a bivalent metal, preferably magnesium or zinc.

The following examples are furnished by way of further illustration.

EXAMPLE 11

12.3 g of diethyl-zinc were dropped under nitrogen at room temperature and, while stirring, into a solution of 8.7 g $VOCl_3$ into 250 cc Fischer-Tropsch diesel oil. The mixture was stirred for one half an hour together with 750 cc diesel oil at 60° C. and transferred to a 5 l autoclave equipped with a stirrer device. 680 g propylene were pressed into the autoclave and the reaction mixture was stirred for 42 hours at 70° to 80° C. After cooling off the autoclave the excess propylene was vented. Part of the polypropylene was present as a precipitate and any dissolved polypropylene was precipitated by the addition of acetone to the diesel oil. The polymer was removed by filtration, then washed with acetone for the removal of the diesel oil and then treated with methanolic hydrochloric acid and with methanol until the same was freed as much as possible from catalyst material. After drying 85 g of a substantially colorless polypropylene are obtained.

EXAMPLE 12

35.2 g of dihexyl-zinc were dropped into a solution of 9.5 g of titanium tetrachloride into 250 cc isooctane, the mixture being stirred for half an hour at 70° C. The same was then transferred into a 5 l stirrer-autoclave together with 750 cc isooctane. 635 g propylene were then passed into the autoclave and the reaction mixture was stirred for 56 hours at 70°-80° C. After working up the reaction products as set forth in Example 10, 56 g of a substantially colorless polypropylene were obtained.

EXAMPLE 13

75 cc of a suspension of propyl-magnesium chloride in toluol were prepared as set forth in Example 5. This suspension was ground together with 18.4 g of titanium tetrabromide for 2 hours in a fast ball mill. The resulting now dark colored, suspension was transferred into a 5 l stirrer autoclave together with 925 cc toluol. 610 g propylene were pressed into the autoclave and the reaction mixture was stirred for 51 hours at 70°-80° C. After working up the resulting products as set forth in examples 11 and 12, 295 g of polypropylene were obtained.

Within the practical application of molecular weight adjustments, as herein set forth, the mol ratio of the organo metal "first" component to heavy metal "second" component is preferably adjusted to a value within the range of from 0.2 : 1 to 8 : 1 to thereby obtain a predetermined degree of polymerization of said polymer, said value being so selected that the higher the desired molecular weight to be obtained the larger is to be the component amount of said first component and the lower the desired molecular weight to be obtained the smaller is to be the component amount of said first component.

We claim:

1. Method for the production of polymers which comprises contacting at least one alpha-olefin selected from the group consisting of ethylene, propylene and isobutylene, at a pressure below 100 atmospheres, with a catalyst formed from a mixture of a first and second component, said first component being present in about 0.1 to 12 times the molar amount of the second component and essentially consisting of a magnesium or zinc di-lower alkyl and said second component essentially consisting of a non-ionized heavy metal compound selected from the group consisting of salts and freshly precipitated oxides and hydroxides of metal of groups IV-B, V-B, and VI-B of the Periodic System, including thorium and uranium, and recovering the high molecular polymer formed.

2. Method according to claim 1 in which said second component is a member selected from the group consisting of halides, oxyhalides, complex halides, freshly precipitated oxides, freshly precipitated hydroxides, alcoholates, acetates, benzoates, and acetylacetonates.

3. Method according to claim 2 in which said second component is a chloride.

4. Method according to claim 1 in which said member of said last-mentioned group is titanium.

5. Method according to claim 4 in which said second component is titanium tetrachloride.

6. Method according to claim 1 in which said last-mentioned group member is chromium.

7. Method according to claim 1 in which said last-mentioned group member is zirconium.

8. Method according to claim 7 in which said second component is zirconium tetrachloride.

9. Method according to claim 1 in which said second component is Ti(OC$_4$H$_9$)$_4$.

10. Method according to claim 1 in which an admixture of the catalyst in a solvent is used.

11. Process according to claim 1 in which said catalyst is formed by a mixture of said first and second component while at least one thereof is in solution in a solvent.

12. Method according to claim 1 in which the mol ratio of said first component to said second component is adjusted to a value within the range of from 0.2 : 1 to 8 : 1.

13. The method of claim 1 wherein the alpha-olefin is ethylene.

14. The method of claim 1 wherein the alpha-olefin is propylene.

15. Method for the production of polymers which comprises contacting ethylene at a pressure below 100 atmospheres with a catalyst formed from a mixture of a first and second component, said first component being present in about 0.1 to 12 times the molar amount of the second component and essentially consisting of a metal compound of the general formula MeR'R" in which R' is a member selected from the group consisting of alkyl, aryl, aralkyl and alkyl aryl radicals, R" is a member selected from the group consisting of alkyl, aryl, aralkyl and alkyl aryl radicals and halogen atoms, and Me is a metal selected from the group consisting of magnesium and zinc, said second component essentially consisting of a non-ionized heavy metal compound selected from the group consisting of salts and freshly precipitated oxides and hydroxides of metals of groups IV-B, V-B, and VI-B of the Periodic System, including thorium and uranium, and recovering the high molecular polymer formed.

16. Method according to claim 15 in which said contacting is effected at a pressure below 10 atmospheres.

17. Method according to claim 15 in which said contacting is effected at substantially atmospheric pressure.

18. Method according to claim 15 in which said contacting is effected at a temperature above 50° C.

19. Method according to claim 15 in which said contacting is effected in the presence of a solvent for at least one of said component and inert thereto.

20. Method according to claim 15 in which said organo metal compound is in the form of a Grignard reagent.

21. Method according to claim 15 in which R' is lower alkyl.

22. Method for the production of polymers which comprises contacting an alpha-olefin with a catalyst formed by a mixture of a first and second component, said first component essentially consisting of a magnesium or zinc di-lower alkyl and said second component essentially consisting of a non-ionized heavy metal compound selected from the group consisting of salts and freshly precipitated oxides and hydroxides of metals of groups IV-B, V-B, and VI-B of the Periodic System, including thorium and uranium, and recovering the high molecular polymer formed.

23. Method according to claim 22 in which said organo metal compound is a lower magnesium dialkyl.

24. Method according to claim 22 in which said organo metal compound is a lower zinc dialkyl.

25. Method for the production of polymers which comprises contacting ethylene at a pressure below 100 atmospheres with a catalyst formed from a mixture of a first and second component, said first component being present in about 0.1 to 12 times the molar amount of the second component and essentially consisting of a metal compound of the general formula $$R\ Mg\ Y$$

wherein R is a hydrocarbon radical, Y is a substituent selected from the group consisting of R, a halogen atom and OR', and R' is a hydrocarbon radical, said second component essentially consisting of a non-ionized heavy metal compound selected from the group consisting of salts and freshly precipitated oxides and hydroxides of metals of groups IV-B, V-B, and VI-B of the Periodic System, including thorium and uranium, and recovering the high molecular polymer formed.

26. A process according to claim 25 wherein a heavy metal compound soluble in inert organic solvents is used.

27. Method for the production of polymers which comprises contacting ethylene at a pressure below 100 atmospheres with a catalyst formed from a mixture of a first and second component, said first component being present in about 0.1 to 12 times the molar amount of the second component and essentially consisting of a metal compound of the general formula $$R\ Zn\ Y$$

wherein R is a hydrocarbon radical, Y is a substituent selected from the group consisting of R, a halogen atom and OR', and R' is a hydrocarbon radical, said second component essentially consisting of a non-ionized heavy metal compound selected from the group consisting of salts and freshly precipitated oxides and hydroxides of metals of groups IV-B, V-B, and VI-B of the Periodic System, including thorium and uranium, and recovering the high molecular polymer formed.

28. A process according to claim 27 wherein a heavy metal compound soluble in inert organic solvents is used.

29. The process which comprises contacting ehtylene with a polymerization initiator consisting essentially of a di-lower alkyl zinc and titanium tetrachloride in the presence of an inert organic solvent.

* * * * *

UNITED STATES PATENT AND TRADEMARK OFFICE
CERTIFICATE OF CORRECTION

PATENT NO. : 4,063,009

DATED : Dec. 13, 1977

INVENTOR(S) : Karl Ziegler, et al

It is certified that error appears in the above-identified patent and that said Letters Patent are hereby corrected as shown below:

| | |
|---|---|
| Title Page, Assignee & inventors (5 occurrences) | Cancel "Mulheim" and substitute--Mülheim--. |
| Col. 3, line 13 | Cancel "fur" and substitute--für--. |
| Col. 3, line 20 | Cancel "fur" and substitute--für--. |
| Col. 7, line 51 | Cancel " "mil" " and substitute--"mild"--. |
| Col. 9, line 20 | Cancel "be" and substitute--in--. |
| Col. 10, line 45 | Cancel "or" and substitute--of--. |
| Col. 11, line 16 | Cancel "the"(1st occurr.) and substitute--then--. |
| Col. 12, line 6 | Cancel "500" and substitute--250--. |
| Col. 14, line 31 | Cancel "extraordinary" and substitute --extraordinarily--. |

UNITED STATES PATENT AND TRADEMARK OFFICE
CERTIFICATE OF CORRECTION

PATENT NO. : 4,063,009

DATED : December 13, 1977

INVENTOR(S) : Karl Ziegler, et al

It is certified that error appears in the above-identified patent and that said Letters Patent are hereby corrected as shown below:

Col. 15, line 10    Cancel "inex" and substitute --index--.

Signed and Sealed this

Twenty-fourth Day of July 1979

[SEAL]

Attest:

Attesting Officer

LUTRELLE F. PARKER
*Acting Commissioner of Patents and Trademarks*